UNITED STATES PATENT OFFICE.

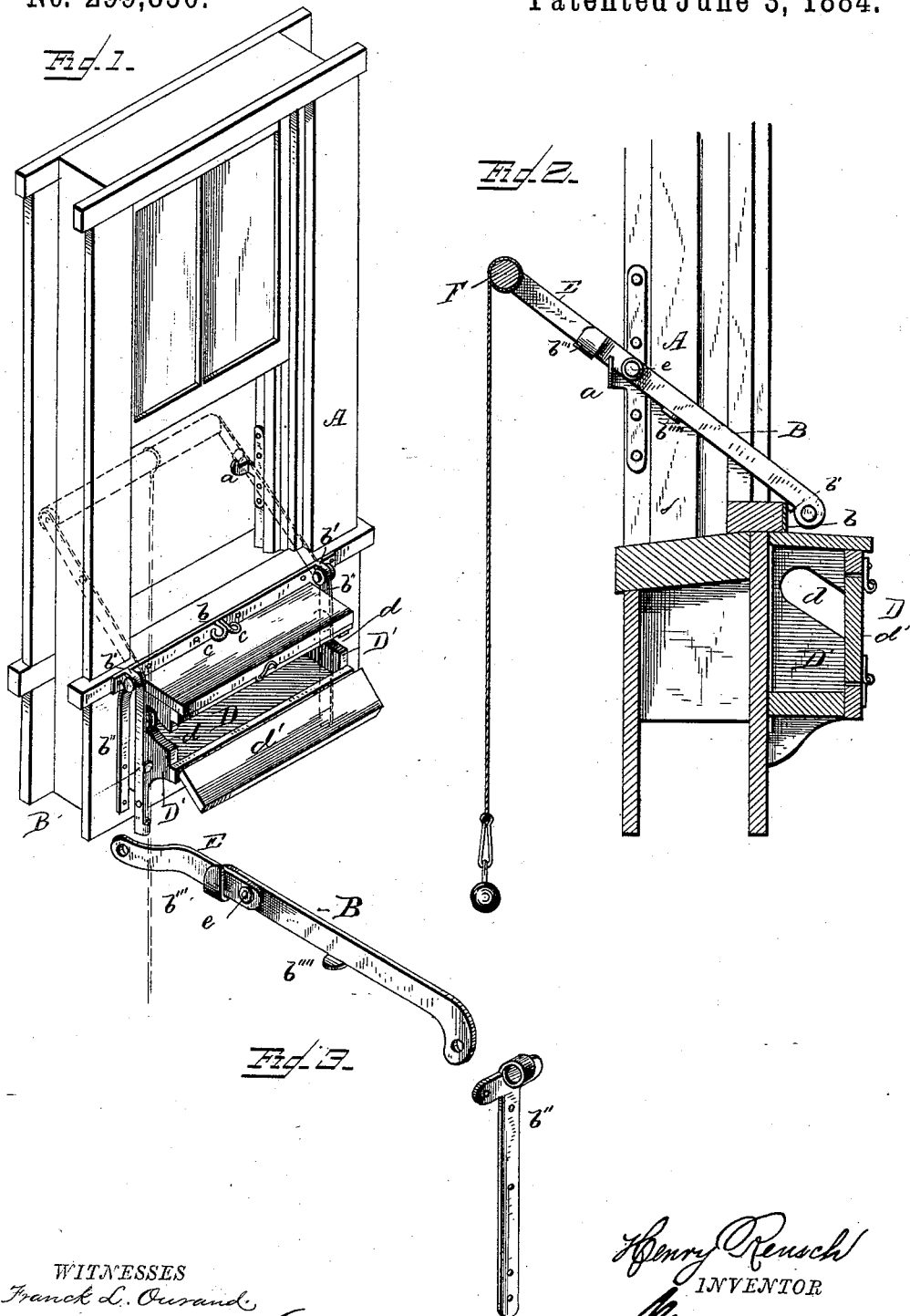

HENRY RENSCH, OF QUINCY, ILLINOIS.

FIRE-ESCAPE.

SPECIFICATION forming part of Letters Patent No. 299,850, dated June 3, 1884.

Application filed March 15, 1884. (No model.)

*To all whom it may concern:*

Be it known that I, HENRY RENSCH, a citizen of the United States of America, residing at Quincy, in the county of Adams and State of Illinois, have invented certain new and useful Improvements in Fire-Escapes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in fire-escapes, and is designed more especially as an improvement upon my patent dated July 10, 1883, and numbered 281,136.

In the annexed drawings, Figure 1 is a perspective view from the interior of a building, showing the apparatus in a folded position in full lines, and in a position for use in dotted lines. Fig. 2 is a sectional view, and Fig. 3 is a detail perspective view.

A represents the window-casing, which is provided on its outside, at a suitable distance above the lower edge of the same, with brackets $a$.

Along the lower inner edge of the window-casing is secured a metallic strip, $b$, which is provided near the sides of the window-casing with inwardly-projecting portions $b'$ and strips $b''$, which extend downwardly to the wash-board. The inwardly-projecting portions $b'$ form bearings for the reception of the pivot attached to the swinging arms.

Near the center of the window, and to the strip $b$, are attached hooks $c\ c$, which project in different directions downwardly and inwardly.

Between the strips $b''\ b''$, and under the window, is attached a receptacle, D, for the roller (which roller is made of wood or metal) and rope of my improved fire-escape, which receptacle or box consists of side brackets, $D'\ D'$, (made of wood or metal,) which have an upwardly-inclined cut-away portion, $d\ d$, within which the roller will lie, and a hinged front, $d'$, which can be secured in a closed position by a hook or button. The top of this box is flat and only slightly below the window-sill, and may be used as a stand for flowers or other small objects.

To the inwardly-projecting portions $b'$ are pivoted swinging arms B, which are of a sufficient length to extend beyond the brackets $a$. The ends of these arms are provided with an upturned portion, $b'''$, and intermediately with an angular projecting lug, $b''''$.

Near the ends of the arms B are secured, by means of rivets or bolts $e$, short arms E, which are bent inwardly near their ends, and provided with perforations for the reception of the journals of the roller F, around which the rope, flexible ladder, or iron chain is wound.

When the fire-escape is not in use, it can be folded so that the long and short arms will lie adjacent and parallel to each other, and the roller will lie within the recesses $d\ d$ in the upper part of the sides of the box, so as to occupy but little room, the lug $b''''$ on the arm B preventing the short arm E being passed beyond the same.

When it is desired to place the fire-escape in position for use, the front of the box is opened and the roller F drawn out. The long arms B are then raised and turned outwardly, so as to rest upon the brackets $a\ a$, after which the short arms are raised and turned so that they will rest upon the lower part of the upturned portion $b'''$ at the end of the long arm. By this construction I provide a means of escape from buildings which will be always ready for use, and can be folded into a small space, and can be readily placed in position for operation.

The apparatus, having long and short arms, can be more compactly folded and placed in position through a small opening.

The roller may be provided with two cords, which are wound in different directions, by which means a person can be let down by a person from within the building or without, and when one rope is unwrapped the other will be wrapped upon the roller. The hooks $c\ c$ are intended to be employed in connection with the supplemental rope as a friction device.

What I claim as my invention is—

1. The receptacle or box provided with a hinged front and cut-away sides, in combination with a roller attached to pivoted side arms, substantially as shown.

2. In a fire-escape, the pivoted arms B, with upturned ends $b'''$ and lug $b''''$, the arms E, pivoted thereto, and provided at their ends with a roller, and brackets $a$, attached to the window-casing, substantially as shown, and for the purpose set forth.

3. In combination with the pivoted arms B, having lugs $b''''$, the short arms E, pivoted as shown, and provided with a roller and a receptacle for the reception of the roller, having a hinged front, substantially as shown, and for the purpose set forth.

In testimony whereof I affix my signature in presence of two witnesses.

HENRY RENSCH.

Witnesses:
 WILLIAM L. PRIEST,
 EDWARD ORSCHEL.